United States Patent
Arai et al.

(10) Patent No.: US 9,873,149 B2
(45) Date of Patent: Jan. 23, 2018

(54) CALIPER CASTING DEVICE, CORE AND MOLD USED IN CALIPER CASTING DEVICE, CALIPER FOR DISC BRAKE, AND MANUFACTURING METHOD THEREOF

(71) Applicant: Akebono Brake Industry Co., Ltd., Tokyo (JP)

(72) Inventors: Takayuki Arai, Tokyo (JP); Iseto Suzuki, Tokyo (JP); Jungo Masuda, Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 14/772,964

(22) PCT Filed: Mar. 14, 2014

(86) PCT No.: PCT/JP2014/001480
§ 371 (c)(1),
(2) Date: Sep. 4, 2015

(87) PCT Pub. No.: WO2015/040769
PCT Pub. Date: Mar. 26, 2015

(65) Prior Publication Data
US 2016/0184883 A1 Jun. 30, 2016

(30) Foreign Application Priority Data

Sep. 20, 2013 (JP) .................................. 2013-196064

(51) Int. Cl.
*F16D 65/00* (2006.01)
*B22C 9/10* (2006.01)
(Continued)

(52) U.S. Cl.
CPC .............. *B22C 9/101* (2013.01); *B22C 9/064* (2013.01); *B22C 9/108* (2013.01); *B22C 9/22* (2013.01);
(Continued)

(58) Field of Classification Search
CPC ........... B22C 9/101; B22C 9/108; B22C 9/10; B22C 9/22; F16D 65/0068; B22D 25/02
(Continued)

(56) References Cited

U.S. PATENT DOCUMENTS 5,168,964 A * 12/1992 Shimmell ............. F16D 55/226
164/98
5,518,062 A * 5/1996 Kobayashi ................ B22C 9/10
164/137
(Continued)

FOREIGN PATENT DOCUMENTS

CN       1871446 A     11/2006
ES       2291123 A1    2/2008
(Continued)

OTHER PUBLICATIONS

Written Opinion and Search Report in International Application No. PCT/JP2014/001480 dated Jun. 23, 2014.
(Continued)

*Primary Examiner* — Christopher Schwartz
(74) *Attorney, Agent, or Firm* — Marshall, Gerstein & Borun LLP

(57) ABSTRACT

A technique is provided capable of favorably preventing generation of a shrinkage cavity in solidification of molten metal poured into a casting mold, and increasing accuracy of an assembling position of a core to a mold, in casting a caliper. A caliper casting device for casting a caliper for a disc brake including a cylinder into which a piston is fitted, and a rotor housing surface that defines a space for housing
(Continued)

a disc rotor, includes: a mold; and a core placed in the mold, the mold having a rotor housing surface forming portion that forms a part of the rotor housing surface after casting, and the core being positioned and held in the rotor housing surface forming portion during casting, and forming a part of the rotor housing surface together with the rotor housing surface forming portion after casting.

11 Claims, 10 Drawing Sheets

(51) Int. Cl.
  *B22C 9/06*   (2006.01)
  *B22D 17/24*   (2006.01)
  *F16D 65/18*   (2006.01)
  *B22C 9/22*   (2006.01)
  *B22D 25/02*   (2006.01)
  *F16D 55/00*   (2006.01)

(52) U.S. Cl.
  CPC ............. *B22D 17/24* (2013.01); *B22D 25/02* (2013.01); *F16D 65/0068* (2013.01); *F16D 65/18* (2013.01); *F16D 2055/0016* (2013.01); *F16D 2200/003* (2013.01); *F16D 2250/0015* (2013.01)

(58) Field of Classification Search
  USPC .............. 29/527.6; 164/76.1, 132, 137, 369; 188/73.1, 73.31
  See application file for complete search history.

(56) References Cited

U.S. PATENT DOCUMENTS

| | | | | |
|---|---|---|---|---|
| 7,232,015 B1 * | 6/2007 | Umehara | ............. | F16D 55/226 148/538 |
| 8,132,612 B2 * | 3/2012 | Morais | ................ | B22D 31/002 164/137 |
| 2005/0061466 A1 * | 3/2005 | Morais | ................ | B22D 31/002 164/76.1 |
| 2012/0085600 A1 * | 4/2012 | Suzuki | ................ | B22D 23/006 188/73.31 |
| 2015/0089790 A1 | 4/2015 | Suzuki et al. | | |
| 2016/0199904 A1 * | 7/2016 | Arai | ......................... | B22C 9/06 188/73.31 |

FOREIGN PATENT DOCUMENTS

| | | | | |
|---|---|---|---|---|
| JP | 2000-254768 A | 9/2000 | | |
| JP | 2009-030802 A | 2/2009 | | |
| JP | 2009-174569 A | 8/2009 | | |
| JP | 2009220160 A | * 10/2009 | ............... | B22C 9/10 |
| JP | 2012082872 A | 4/2012 | | |
| KR | 2010-0089261 A | 8/2010 | | |

OTHER PUBLICATIONS

Examination Report in EP Application No. 14715130.2 dated Apr. 21, 2017, 4 pages.

Second Office Action, Chinese Patent Application No. 201480012593.1, dated Sep. 18, 2017.

\* cited by examiner

[Fig. 1]
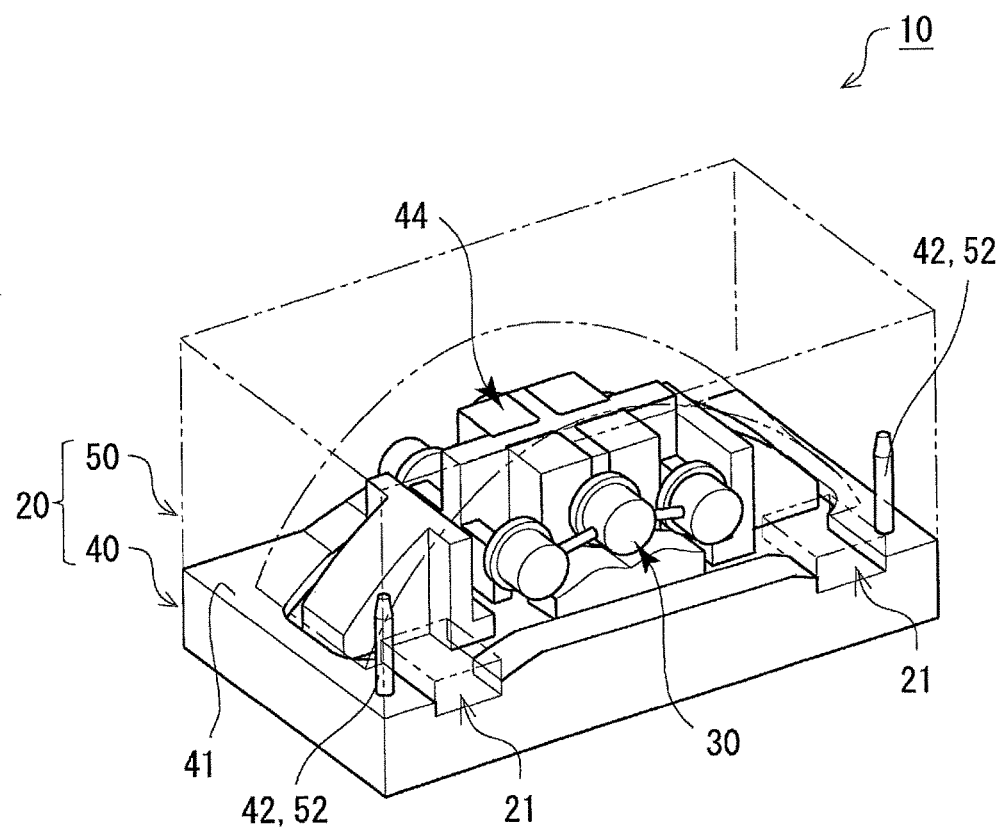

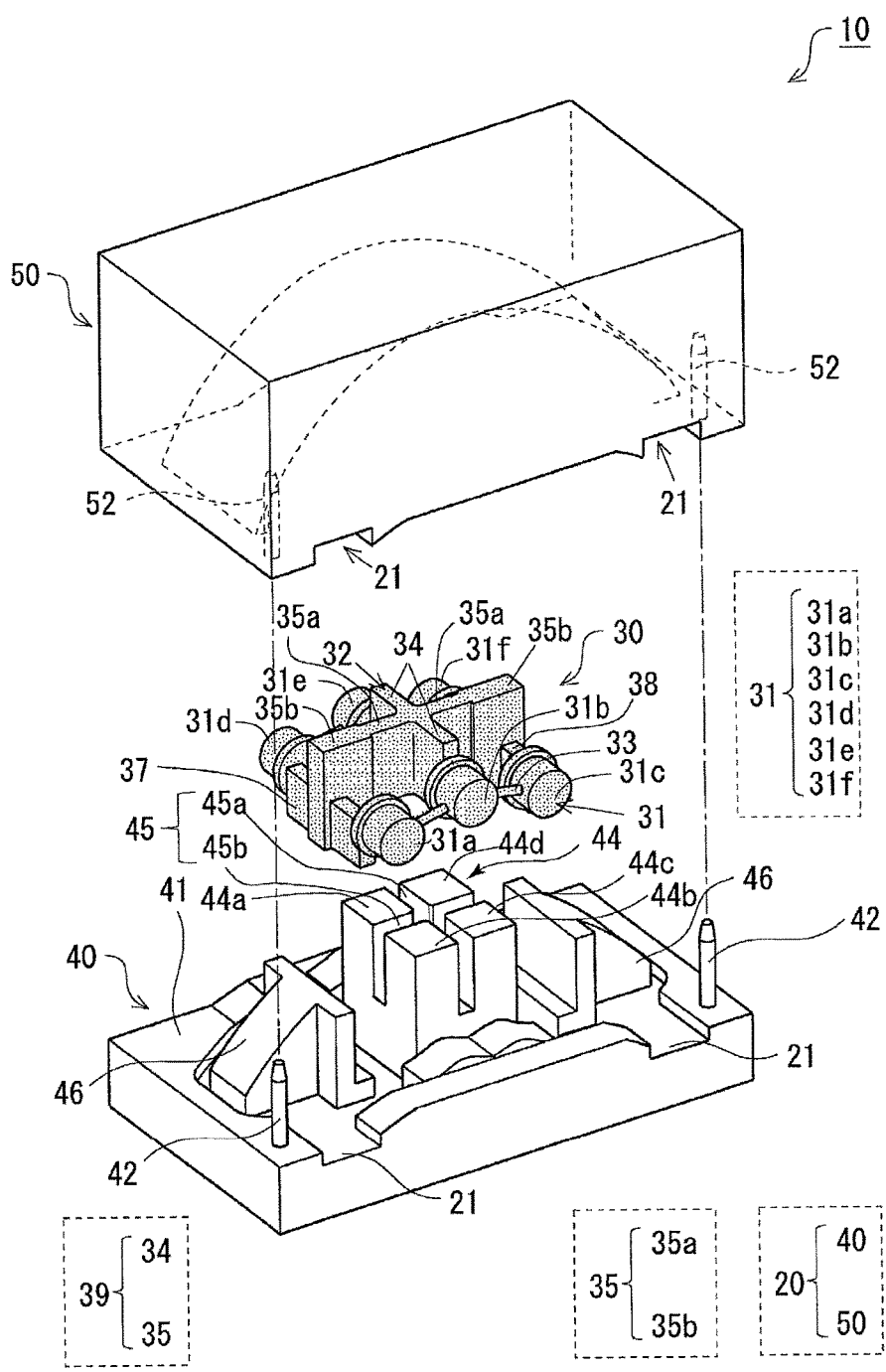
[Fig. 2]

[Fig. 3]
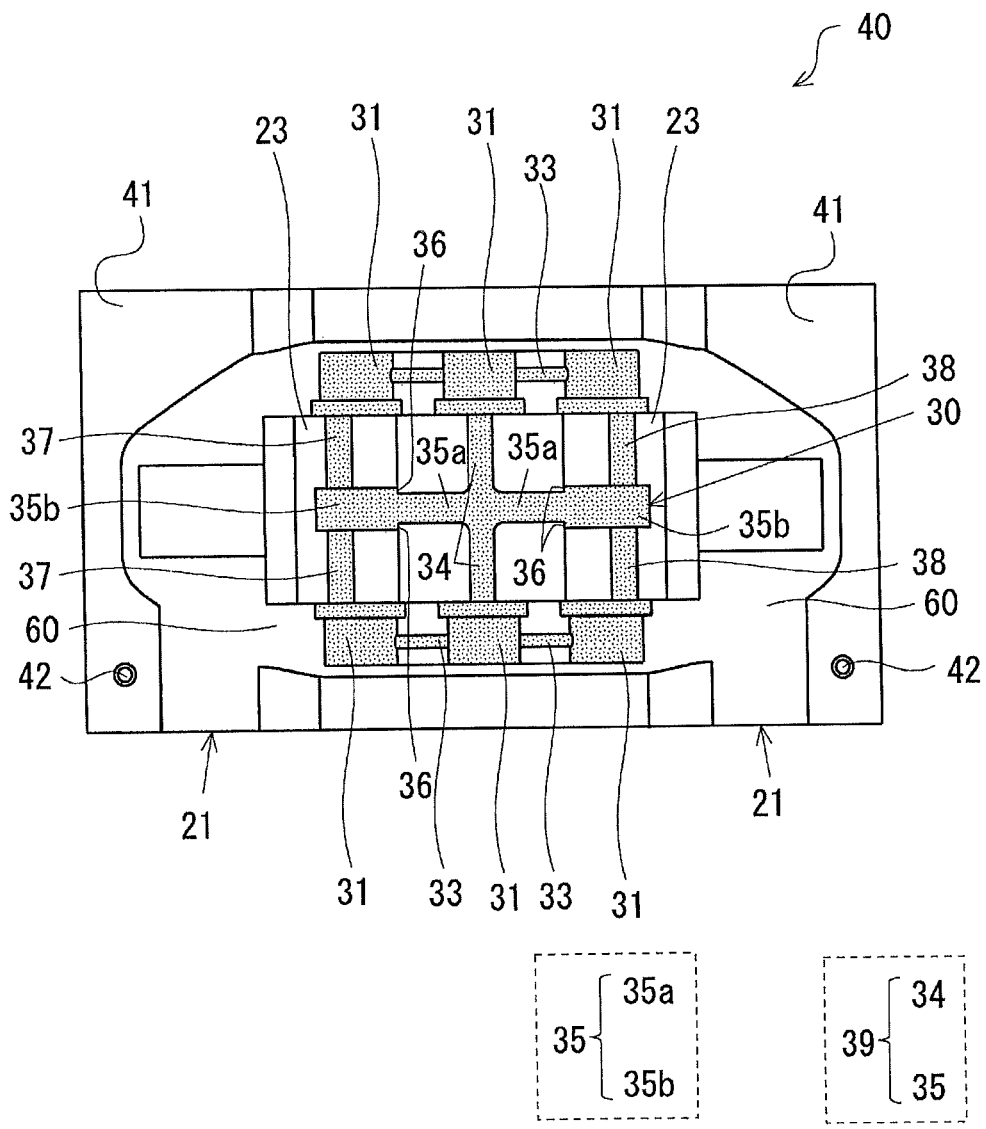

[Fig. 4]
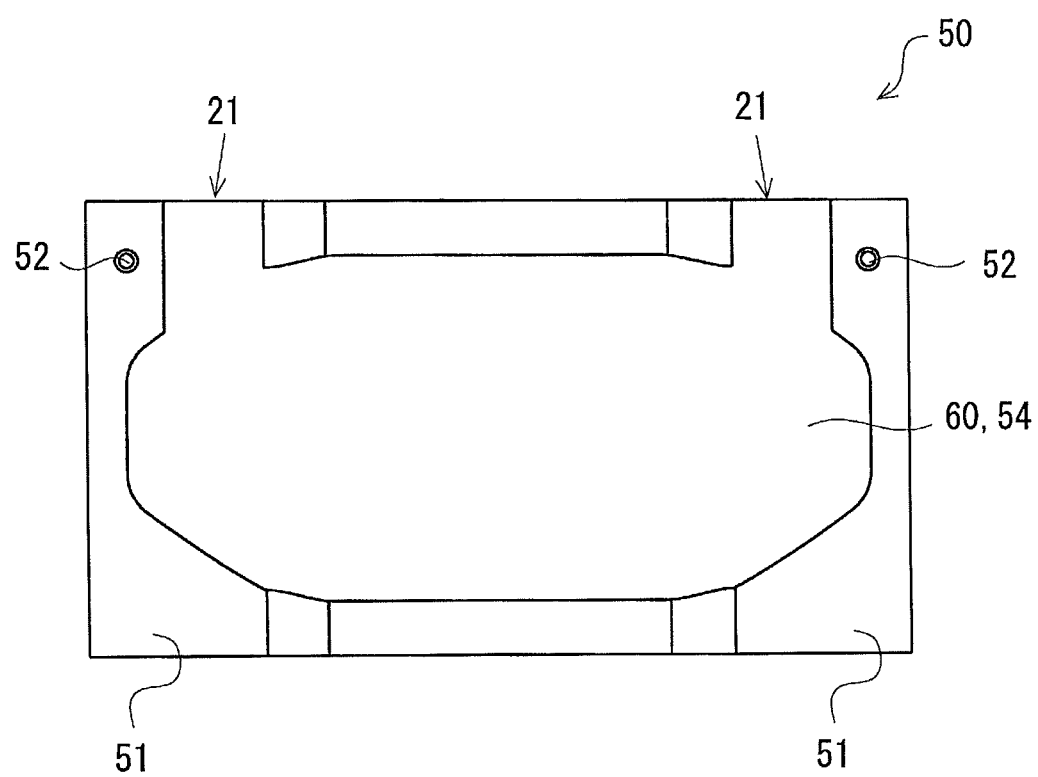

[Fig. 5]
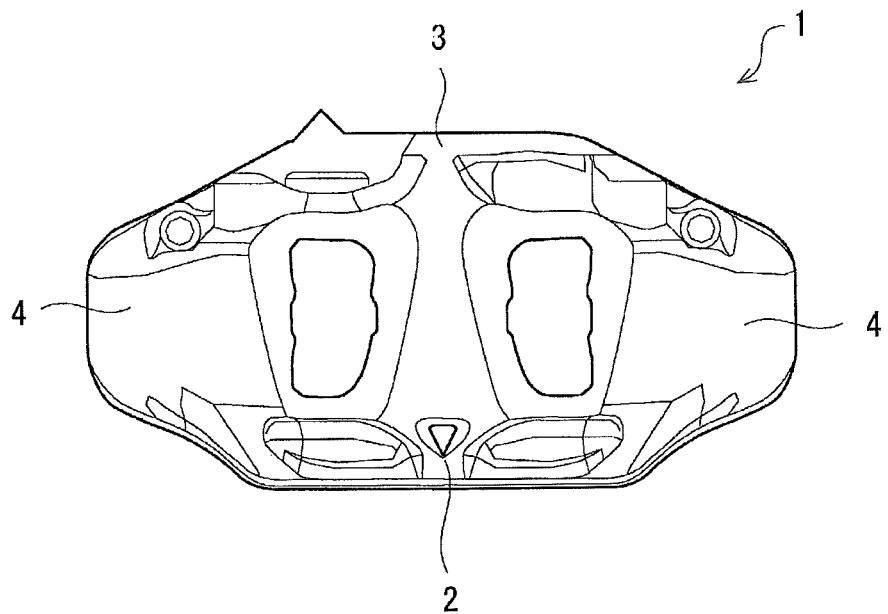
[Fig. 6]
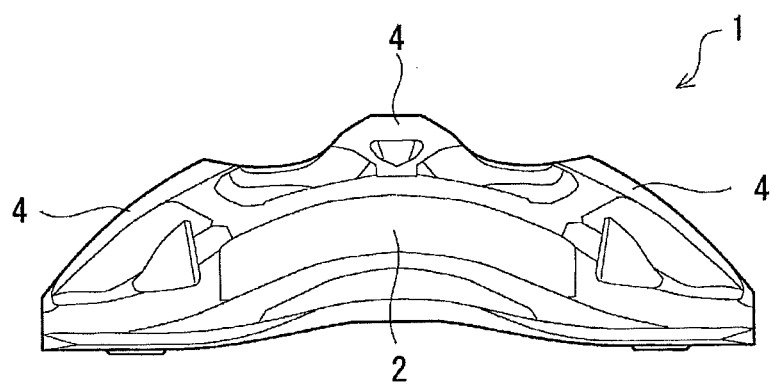

[Fig. 7]
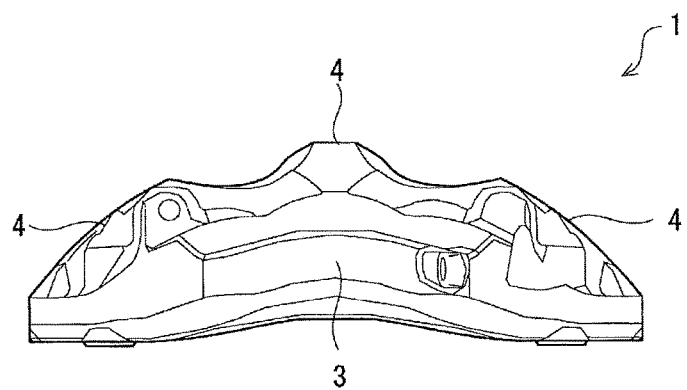
[Fig. 8]
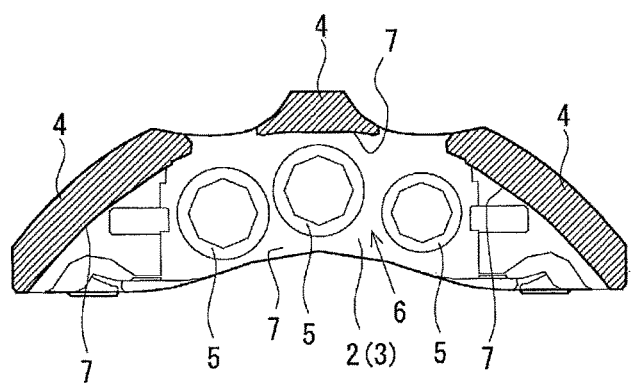

[Fig. 9]
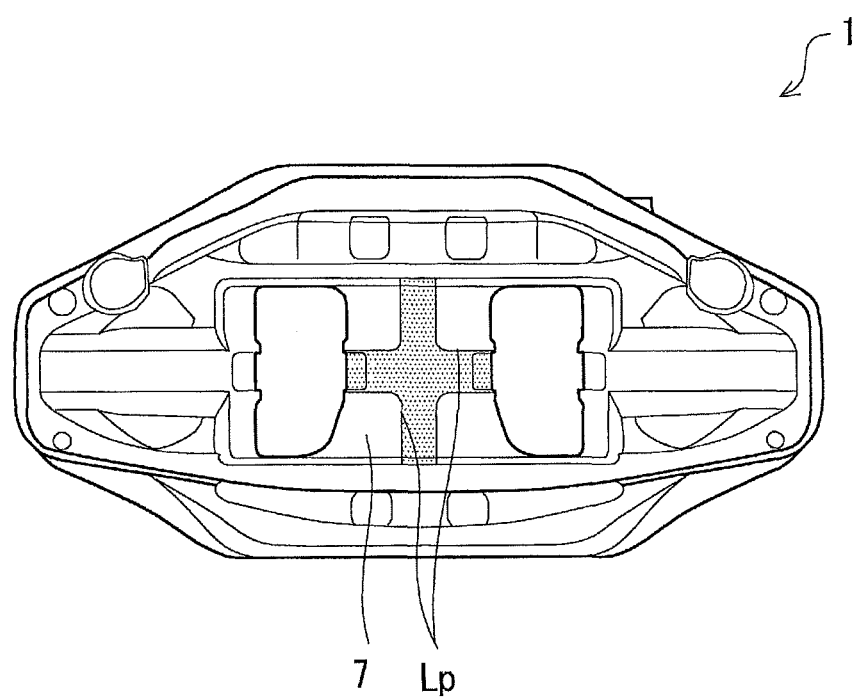
7  Lp

[Fig. 10]
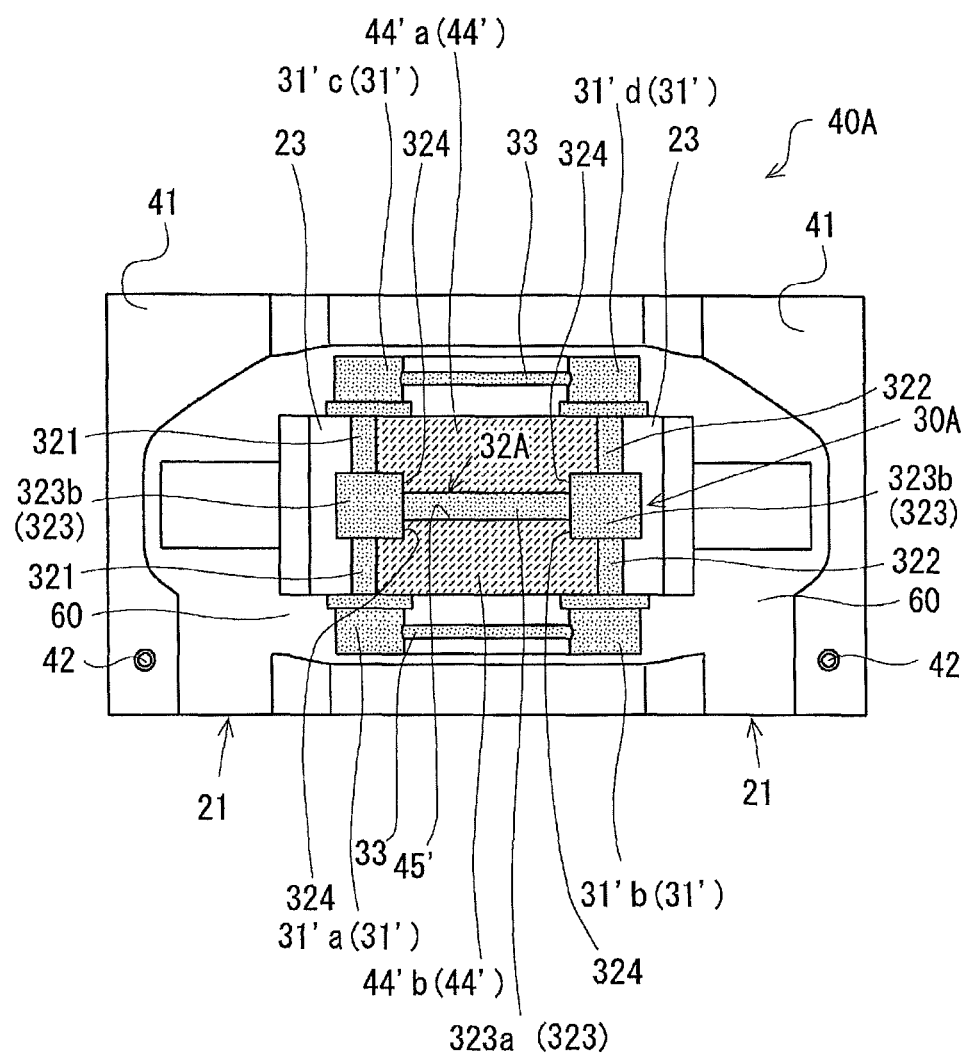

[Fig. 11A]
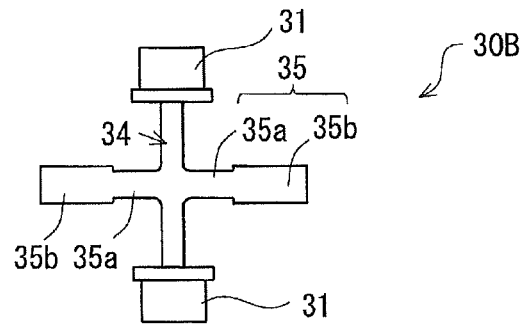
[Fig. 11B]
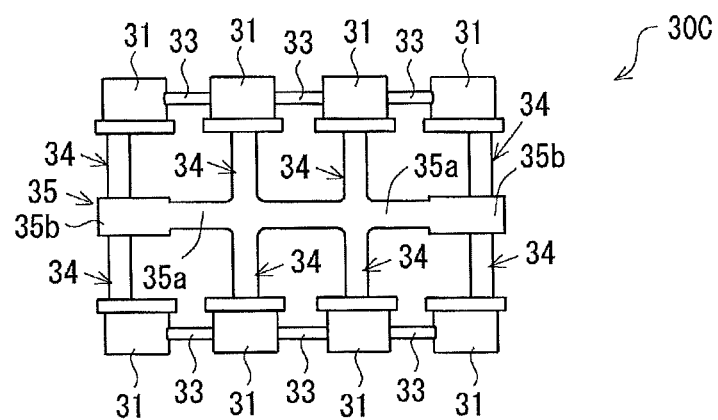
[Fig. 11C]
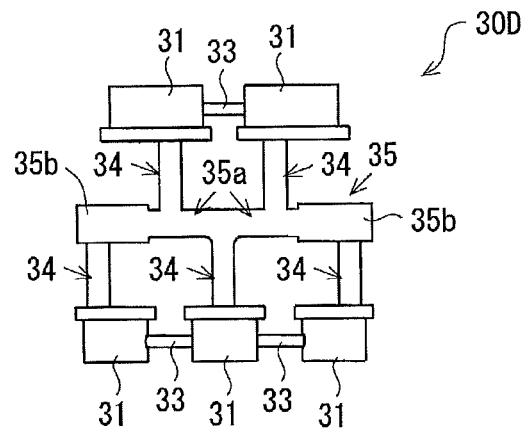

[Fig. 12]
Conventional
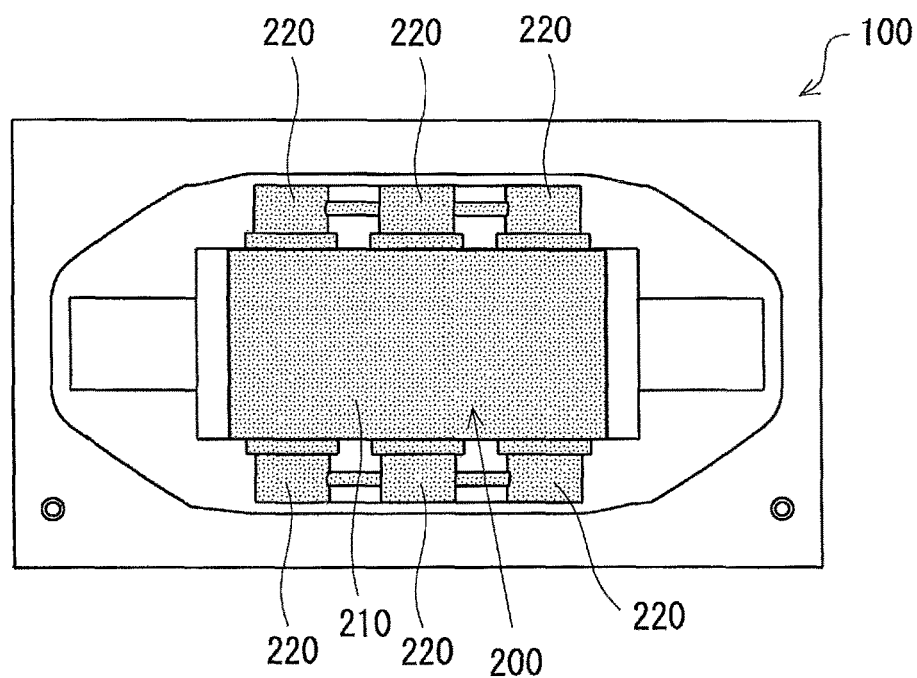

CALIPER CASTING DEVICE, CORE AND MOLD USED IN CALIPER CASTING DEVICE, CALIPER FOR DISC BRAKE, AND MANUFACTURING METHOD THEREOF

TECHNICAL FIELD

The present invention relates to a caliper casting device, a core and a mold used in a caliper casting device, a caliper for a disc brake, and a manufacturing method thereof.

BACKGROUND ART

A disc brake is widely used for braking of an automobile. The disc brake includes a caliper in a position to hold a disc rotor that rotates with a wheel. A known caliper used in a disc brake is an opposed-piston caliper including cylinders therein that face opposite side surfaces of the disc rotor, and pistons fitted in the cylinders. In the opposed-piston caliper, two brake pads are placed so as to face inner and outer side surfaces of the disc rotor. In braking of a vehicle, pressure oil is fed into the cylinders to actuate the pistons and thus press the brake pads against the inner and outer side surfaces of the disc rotor, thereby obtaining a braking force.

The caliper used in the disc brake as described above is generally manufactured by casting. In this casting, generally, a so-called core is placed in a metal mold, and a molten aluminum alloy (molten metal) is poured into a cavity that is a space formed between the mold and the core (for example, Patent document 1). The core is a sand mold fitted into a casting mold as a portion for forming a hollow portion in manufacturing a cast (product) having a hollow portion therein. A generally used core is, for example, a shell core manufactured by shell molding of heating and curing silica sand (resin-coated sand) mixed with thermosetting synthetic resin.

The molten metal is poured into the cavity as described above, then, for example, an upper mold (die) and a lower mold (die) that constitute the mold are separated from each other, and the core is removed, thereby obtaining an intermediate product of a caliper. The intermediate product is subjected to various kinds of machining such as cutting or drilling for ensuring accuracy in shape and dimension of each portion, thereby obtaining a caliper.

CITATION LIST

Patent Literature

[PTL 1]
Japanese Patent Laid-Open No. 2009-30802
[PTL 2]
Japanese Patent Laid-Open No. 2012-82872

SUMMARY OF INVENTION

A shrinkage cavity (pore) needs to be considered in casting the caliper as described above. The molten metal shrinks when solidifying in the cavity, and is thus reduced in volume. For example, it is said that solidification shrinkage of about 7% of a volume occurs for an aluminum alloy. Thus, a shrinkage cavity due to shrinkage in a solidification process of the molten metal may be formed in the caliper obtained as a cast, which may affect quality of a casting product.

FIG. 12 schematically illustrates a conventional casting mold for a caliper. In FIG. 12, reference numeral 100 denotes a lower mold as a metal mold, and reference numeral 200 denotes a core. In FIG. 12, the core 200 is hatched. In FIG. 12, an upper mold to be combined with the lower mold 100 is not illustrated. As illustrated in FIG. 12, the core 200 is placed in a predetermined position of the lower mold 100. The core 200 includes a base 210 for obtaining a space for placement of a disc rotor after manufacturing of the caliper, and cylinder forming portions 220 that are placed on opposite sides of the base 210 and form cylinders into which pistons of the caliper are fitted. In other words, the base 210 is a casting mold for forming a rotor housing surface that defines a housing portion of the disc rotor in the caliper.

As described above, the core 200 is made of thermally cured sand mixed with resin, and has lower thermal conductivity than the mold. Thus, when the upper mold (not illustrated) is combined with the lower mold 100, and then molten metal is poured into a cavity formed in the casting mold, molten metal in an area in contact with the core 200 is more difficult to solidify than molten metal in an area in contact with the mold. Thus, molten metal poured around the core 200 in the pouring process solidifies later than molten metal poured into areas distant from the core 200. As a result, in the casted caliper, a shrinkage cavity is easily generated in a cylinder or a rotor housing surface. A technique is known of providing a feeder head in a casting mold for supplying molten metal when shrinkage occurs with a temperature reduction and solidification of molten metal casted into the cavity, and storing molten metal for preventing a so-called shrinkage cavity. However, as illustrated in FIG. 12, in the conventional core 200, the base 210 has a relatively large volume, and it is actually difficult to sufficiently prevent the shrinkage cavity.

Also, in the conventional core 200, the base 210 has a so-called box-like outer shape, and it is difficult to sufficiently increase accuracy of an assembling position in placing the base 210 in the lower mold 100.

The present invention is achieved in view of the above described problem, and has an object to provide a technique capable of favorably preventing generation of a shrinkage cavity in solidification of molten metal poured into a casting mold, and increasing accuracy of an assembling position of a core to a mold, in casting a caliper.

To achieve the object, the present invention adopts mean described below. Specifically, the present invention provides a caliper casting device for casting a caliper for a disc brake including a cylinder into which a piston is fitted, and a rotor housing surface that defines a space for housing a disc rotor, including: a mold; and a core placed in the mold, the mold having a rotor housing surface forming portion that forms a part of the rotor housing surface after casting, and the core being positioned and held in the rotor housing surface forming portion during casting, and forming a part of the rotor housing surface together with the rotor housing surface forming portion after casting.

According to the present invention, the rotor housing surface of the caliper may be formed by the core, and also the rotor housing surface forming portion that is formed as a part of the mold having higher thermal conductivity than the core. Specifically, casting the caliper with the core being positioned and held by the rotor housing surface forming portion of the mold can increase a cooling speed of molten metal in an area for forming the cylinder or the rotor housing surface of the caliper, and accelerate timing for solidification, as compared to a conventional example. This can prevent generation of a shrinkage cavity in the cylinder or the rotor housing surface of the caliper obtained by casting.

Also, according to the present invention, during casting, the core is positioned and held in the rotor housing surface forming portion of the mold, thereby increasing accuracy of an assembling position of the core to the mold. Specifically, according to the present invention, the caliper casting device can be provided that can favorably prevent generation of a shrinkage cavity in solidification of molten metal poured into the casting mold, and increase accuracy of an assembling position of the core to the mold, in casting the caliper.

In the caliper casting device according to the present invention, a positioning groove that positions and holds the core may be formed in the rotor housing surface forming portion, the core may include a cylinder forming portion that forms the cylinder after casting, and a core print portion coupled to the cylinder forming portion, and the core print portion may have a fitted portion that can be fitted in the positioning groove and forms the rotor housing surface together with the rotor housing surface forming portion after casting. As such, the positioning groove for positioning and holding the core is provided in the rotor housing surface forming portion that is formed as a part of the mold, and the fitted portion included in the core print portion of the core is fitted in the positioning groove, thereby further increasing assembling accuracy of the core. In the caliper casting device according to the present invention, in pouring the molten metal into the mold, the fitted portion of the core may be fitted in the positioning groove provided in the rotor housing surface forming portion. Thus, for example, in a state where the mold is preheated and expanded in a process before the molten metal is poured into the mold (previous process), the fitted portion of the core may be fitted in the positioning groove in the mold. In the present invention, the rotor housing surface forming portion preferably has higher thermal conductivity than the core. Thus, a cooling speed of the molten metal in the area for forming the cylinder or the rotor housing surface of the caliper after casting can be more favorably adjusted.

The positioning groove may include a first groove, and a second groove intersecting the first groove, and the fitted portion may be fitted in the first groove and the second groove. The fitted portion formed in the core print portion of the core is thus fitted in the first groove and the second groove intersecting each other, and thus the positioning groove including the first groove and the second groove functions as a guide for placing the core. This can facilitate centering in assembling of the core, and further increase accuracy of an assembling position. The first groove and the second groove may be linear grooves and perpendicular to each other. This allows the core to be bilaterally symmetrical and increases machinability of the mold. Specifically, machining accuracy of the mold can be increased, and thus accuracy of the assembling position of the core to the mold can be also increased, thereby increasing dimension accuracy of a casting product. The shape formed by the first linear groove and the second linear groove perpendicular to each other may include both a cross shape and a T shape. Specifically, the positioning groove may include at least the first linear groove and the second linear groove, and the positioning groove may be formed with other grooves being added. Thus, the positioning groove may have a cross shape, a T shape, and also an H shape, a # shape, or the like. The positioning groove may have a shape other than these exemplified shapes.

The core print portion may further include a stopper portion that is provided at an end of the fitted portion and is wider than the positioning groove, and the stopper portion may have a stepped surface that abuts against a side surface intersecting the positioning groove in the rotor housing surface forming portion when the fitted portion is fitted in the positioning groove. With such a configuration, the positioning accuracy of the core in placing the core in the mold can be further increased. Also, displacement of the core from a normal position due to a flow of the poured molten metal when the molten metal is poured into the mold can be favorably prevented. The side surface of the mold against which the stepped surface of the stopper portion abuts when the core is assembled to the mold may be perpendicular to the positioning groove in the rotor housing surface forming portion.

The core may have a plurality of the cylinder forming portions, and each of the cylinder forming portions may be coupled by the core print portion.

The present invention may be embodied as a caliper for a disc brake that is casted using the caliper casting device according to any of the above.

The present invention may be embodied as a core used in a caliper casting device. Specifically, the present invention provides a core used in a caliper casting device for casting a caliper for a disc brake including a cylinder into which a piston is fitted, and a rotor housing surface that defines a space for housing a disc rotor, wherein the core is positioned and held, during casting, in a rotor housing surface forming portion of a mold in the caliper casting device which forms a part of the rotor housing surface after casting, and forms a part of the rotor housing surface together with the rotor housing surface forming portion after casting.

The present invention may be embodied as a mold used in a caliper casting device. Specifically, the present invention provides a mold used in a caliper casting device for casting a caliper for a disc brake including a cylinder into which a piston is fitted, and a rotor housing surface that defines a space for housing a disc rotor, wherein the mold has a rotor housing surface forming portion that forms a part of the rotor housing surface after casting, and can position and hold a core that forms a part of the rotor housing surface together with the rotor housing surface forming portion after casting.

The present invention may be embodied as a manufacturing method for manufacturing a caliper for a disc brake. Specifically, the present invention provides a manufacturing method for manufacturing a caliper for a disc brake including a cylinder into which a piston is fitted, and a rotor housing surface that defines a space for housing a disc rotor, wherein the caliper casting device includes a mold having a rotor housing surface forming portion that forms a part of the rotor housing surface after casting, and a core placed in the mold, and the manufacturing method includes the steps of: positioning and holding the core in the rotor housing surface forming portion to place the core in the mold; and pouring molten metal into the mold in which the core is placed.

The present invention may be embodied as a caliper for a disc brake manufactured with the manufacturing method described above.

The means for solving the problems in the present invention may be combined if possible.

According to the present invention, a technique can be provided capable of favorably preventing generation of a shrinkage cavity in solidification of molten metal poured into a casting mold, and increasing accuracy of an assembling position of a core to a mold, in casting a caliper.

BRIEF DESCRIPTION OF DRAWINGS

FIG. 1 illustrates a schematic configuration of a caliper casting device according to Embodiment 1.

FIG. 2 is an exploded perspective view of the caliper casting device according to Embodiment 1.

FIG. 3 illustrates a lower mold in which a core that constitutes the caliper casting device according to Embodiment 1 is placed.

FIG. 4 illustrates an upper mold that constitutes the caliper casting device according to Embodiment 1.

FIG. 5 is an orthographic view of a caliper according to Embodiment 1 seen from an outer diameter side.

FIG. 6 is an orthographic view of the caliper according to Embodiment 1 seen from one lateral side.

FIG. 7 is an orthographic view of the caliper according to Embodiment 1 seen from the other lateral side.

FIG. 8 is a main sectional view of the caliper according to Embodiment 1.

FIG. 9 is an orthographic view of the caliper according to Embodiment 1 seen from an axis side of a rotor.

FIG. 10 illustrates variants of the lower mold and the core according to Embodiment 1.

FIG. 11A illustrates another variation of the core according to Embodiment 1 (1).

FIG. 11B illustrates a further variation of the core according to Embodiment 1 (2).

FIG. 11C illustrates a further variation of the core according to Embodiment 1 (3).

FIG. 12 schematically illustrates a conventional caliper casting mold.

DESCRIPTION OF EMBODIMENTS

Now, embodiments of a caliper casting device, a core and a mold used in the caliper casting device, and a caliper for a disc brake according to the present invention will be exemplarily described in detail with reference to the drawings. Dimensions, materials, shapes, and relative arrangement of components described in the embodiments are not intended to limit the technical scope of the invention to them unless otherwise stated.

Embodiment 1

FIG. 1 illustrates a schematic configuration of a caliper casting device according to Embodiment 1. FIG. 2 is an exploded perspective view of the caliper casting device according to Embodiment 1. FIG. 3 illustrates a lower mold (die) in which a core that constitutes the caliper casting device according to Embodiment 1 is placed. FIG. 4 illustrates an upper mold (die) that constitutes the caliper casting device according to Embodiment 1. FIGS. 5 to 9 illustrate an example of an appearance of a caliper 1 casted by the caliper casting device according to Embodiment 1. FIG. 5 is an orthographic view of the caliper 1 according to Embodiment 1 seen from an outer diameter side of a disc rotor. FIG. 6 is an orthographic view of the caliper 1 according to Embodiment 1 seen from one lateral side. FIG. 7 is an orthographic view of the caliper 1 according to Embodiment 1 seen from the other lateral side. FIG. 8 is a main sectional view of the caliper 1 according to Embodiment 1. FIG. 9 is an orthographic view of the caliper 1 according to Embodiment 1 seen from an axis side of the disc rotor.

First, with reference to FIGS. 5 to 9, a schematic configuration of the caliper 1 according to the embodiment will be described. The caliper 1 is used in an opposed-piston disc brake, and is an aluminum caliper integrally made of an aluminum alloy. The caliper 1 includes a first body portion 2 and a second body portion 3 placed on axially opposite sides of a disc rotor (not illustrated) that rotates with a wheel, and a coupling portion 4 that couples the body portions 2, 3, which are integrally formed. In the illustrated example, three cylinders 5 are provided in each of the first body portions 2 and the second body portions 3, and thus a total of six cylinders 5 are provided in the entire caliper 1. In an assembled state of the disc brake, a piston (not illustrated) is fitted into each cylinder 5.

Between the first body portion 2 and the second body portion 3, a housing portion 6 is formed that is a space in which the disc rotor described above and a pair of brake pads (not illustrated) are housed (placed). The housing portion 6 is defined by the rotor housing surface 7. The rotor housing surface 7 is formed as inner wall surfaces of the first body portion 2, the second body portion 3, and the coupling portion 4. Other basic structures of the caliper 1 are the same as in a conventional caliper made of an aluminum alloy, and thus detailed descriptions thereof will be omitted.

The caliper 1 described above is casted by a caliper casting device (hereinafter simply referred to as "casting device") 10 illustrated in FIGS. 1 to 4. The casting device 10 is a casting mold for casting the caliper 1. The casting device 10 includes a metal mold 20 and a core 30. The core 30 is a sand mold to be placed in the mold 20 in a combined state. The core 30 will be described later in detail. In casting the caliper 1 with the casting device 10, a molten aluminum alloy (molten metal) is poured into a cavity 60, which is a space existing (formed) between an inside of the mold 20 and an outside of the core 30 (pouring). The molten metal is poured from outside into the cavity 60 through gates (pouring gates or sprues) 21 in FIG. 1. In the example in FIG. 1, the casting device 10 includes two gates 21, but the number of the gates may be changed. A size and a placement position of the gate 21 are changeable matters of design choice. The molten metal is poured through the gate 21 into the cavity 60 with the casting device 10 being raised about 90 degrees from the position in FIG. 1 and an opening of the gate 21 being directed substantially vertically upward. Of course, the position of the casting device 10 during pouring may be changed.

The mold 20 is constituted by a lower mold 40 and an upper mold 50. The core 30 is assembled to (placed in) the lower mold 40, and then the lower mold 40 and the upper mold 50 are coupled using a fastener or the like. Thus, assembling of the casting device 10 is completed, moving to a pouring process of pouring the molten metal through the gate 21. The lower mold 40 is a mold for mainly forming a vertically lower portion of the caliper 1 after casting, and the upper mold 50 is a mold for mainly forming a vertically upper portion of the caliper 1.

Next, detailed structures of the mold 20 (the lower mold 40 and the upper mold 50) and the core 30 will be described. The mold 20 may be made of, for example, alloy tool steel such as FC250, S50C, S55C, or SKD61, but not limited to them. The lower mold 40 and the upper mold 50 have joint surfaces 41, 51 placed on each other in coupling. The joint surface 41 of the lower mold 40 has two positioning pins 42. The joint surface 51 of the upper mold 50 has an insertion hole 52 into which the positioning pin 42 can be inserted. When the lower mold 40 and the upper mold 50 are coupled to assemble the casting device 10, the positioning pin 42 is inserted into the insertion hole 52, thereby allowing the lower mold 40 and the upper mold 50 to be placed in prescribed plane positions. In this embodiment, two positioning pins 42 and two insertion holes 52 are provided in the lower mold 40 and the upper mold 50, respectively, but the number thereof may be changed.

As illustrated in FIG. 2, a rotor housing surface forming portion 44 that forms a part of a rotor housing surface 7 after casting protrudes from an inner surface of the lower mold 40. In the rotor housing surface forming portion 44, a cross positioning groove 45 is provided. The rotor housing surface forming portion 44 is divided into four mold blocks 44a to 44d by the positioning groove 45. The rotor housing surface forming portion 44 constituted by the mold blocks 44a to 44d is a mold for forming the rotor housing surface 7 of an area corresponding to an area around a circumferential center of the caliper 1 after casting. As is apparent from FIG. 2, the positioning groove 45 is a cross groove formed in the rotor housing surface forming portion 44 in a cross shape. In the positioning groove 45 formed as the cross groove, a linear groove parallel to a short direction of the mold 20 is referred to as a "first positioning groove 45a", and a linear groove parallel to a long side of the mold 20 is referred to as a "second positioning groove 45b". The first positioning groove 45a and the second positioning groove 45b are perpendicular to each other. The long direction of the mold 20 corresponds to a circumferential direction of the disc rotor placed in the housing portion 6 of the caliper 1 after casting. The short direction of the mold 20 corresponds to an axial direction of the disc rotor placed in the housing portion 6 of the caliper 1 after casting. In this embodiment, the first positioning groove 45a is an example of a first groove, and the second positioning groove 45b is an example of a second groove. The first positioning groove 45a and the second positioning groove 45b may diagonally intersect each other rather than be perpendicular to each other.

In the lower mold 40, on opposite sides of the rotor housing surface forming portion 44, second rotor housing surface forming portions 46 protrude from the inner surface of the lower mold 40 away from the rotor housing surface forming portion 44. The second rotor housing surface forming portion 46 is a mold for forming a rotor housing surface 7 in an area closer to a circumferential end of the caliper 1 after casting.

Next, the core 30 will be described. The core 30 is a sand mold placed in the lower mold 40. The core 30 is placed in the mold 20 as a portion for forming a hollow portion such as the cylinder 5 of the caliper 1. In this embodiment, the core 30 is a shell core manufactured by shell molding of heating and curing silica sand (resin sand) mixed with thermosetting synthetic resin.

The core 30 includes a cylinder forming portion 31 for forming the cylinder 5 after casting, a core print portion 32 coupled to the cylinder forming portion 31, an oil passage forming portion 33, or the like. The caliper 1 is a six-pot opposed-piston caliper in which three cylinders 5 are arranged in each of the first body portion 2 and the second body portion 3, and the cylinders 5 in the first body portion 2 and the second body portion 3 are placed to face each other. Thus, the core 30 also includes a total of six cylinder forming portions 31.

The six cylinder forming portions 31 are denoted by reference numerals 31a to 31f. As illustrated in FIGS. 2 and 3, the cylinder forming portions 31a to 31c are arranged in a row and the cylinder forming portions 31d to 31f are arranged in a row. The core print portion 32 is provided between the cylinder forming portions 31a to 31c and the cylinder forming portions 31d to 31f, and the core print portion 32 integrally couples the cylinder forming portions 31a to 31f. The cylinder forming portion 31a and the cylinder forming portion 31d are provided to face each other, the cylinder forming portion 31b and the cylinder forming portion 31e are provided to face each other, and the cylinder forming portion 31c and the cylinder forming portion 31f are provided to face each other.

The core print portion 32 includes a first beam 34 that couples the cylinder forming portion 31b and the cylinder forming portion 31e, and a second beam 35 perpendicular to the first beam 34. The first beam 34 has the same width as the first positioning groove 45a. The second beam 35 includes a fitted portion 35a to be fitted in the second positioning groove 45b described above, and a pair of stopper portions 35b provided at the opposite ends of the fitted portion 35a. The stopper portion 35b has a larger width than the fitted portion 35a of the second beam 35, and a stepped surface 36 (see FIG. 3) is formed in a boundary between the fitted portion 35a and the stopper portion 35b of the second beam 35. The stepped surface 36 is a surface that connects a side surface of the fitted portion 35a of the second beam 35 and a side surface of the stopper portion 35b, and is formed perpendicularly to the side surface of the second beam 35 and the side surface of the stopper portion 35b. The fitted portion 35a of the second beam 35 has the same width as the second positioning groove 45b. Further, the core print portion 32 includes a third beam 37 that couples the cylinder forming portions 31a and 31d, and a fourth beam 38 that couples the cylinder forming portions 31c and 31f. The third beam 37 and the fourth beam 38 are placed in parallel with the first beam 34 and perpendicularly to the second beam 35. The fitted portion 35a of the second beam 35 has the same length as the second positioning groove 45b, and the stepped surface 36 formed in the boundary between the fitted portion 35a and the stopper portion 35b provided at the opposite ends of the fitted portion 35a abuts against the side surface of the rotor housing surface forming portion 44. In the core 30 according to this embodiment, the stopper portions 35b are provided at the opposite ends of the fitted portion 35a, but the stopper portion 35b is not necessarily provided.

Next, a relationship between the core print portion 32 and the positioning groove 45 will be described. As described above, the first beam 34 and the second beam 35 in the core print portion 32 are perpendicular to each other, and thus the first beam 34 and the second beam 35 constitute a cross beam of a cross shape. The first beam 34 and the second beam 35 are collectively referred to as a cross beam 39 below.

In this embodiment, the first beam 34 and the first positioning groove 45a have the same width, and the fitted portion 35a of the second beam 35 and the second positioning groove 45b have the same width. Thus, the first beam 34 in the cross beam 39 can be fitted in the first positioning groove 45a, and the fitted portion 35a of the second beam 35 in the cross beam 39 can be fitted in the second positioning groove 45b. In this embodiment, in assembling the core 30 to the lower mold 40, the cross beam 39 of the core 30 is fitted in the positioning groove 45 provided in the rotor housing surface forming portion 44, thereby allowing easy and accurate positioning of the core 30. In this embodiment, the cross beam 39 fitted in the positioning groove 45 in placing the core 30 in the lower mold 40 corresponds to a fitted portion in the present invention. With the cross beam 39 (the first beam 34 and the second beam 35) of the core 30 being fitted in the positioning groove 45 (the first positioning groove 45a and the second positioning groove 45b), an upper surface of the cross beam 39 forms the rotor housing surface 7 of the caliper 1 together with the rotor housing surface forming portion 44 after casting.

In this embodiment, the case has been described in which the first beam 34 and the first positioning groove 45a have the same width, and the fitted portion 35a of the second beam 35 and the second positioning groove 45b have the same width, but not limited to this. For example, the first beam 34 may have a slightly smaller width than the first positioning groove 45a, and the fitted portion 35a of the second beam 35 may have a slightly smaller width than the second positioning groove 45b. In placing the core 30 in the lower mold 40, the lower mold 40 may be preheated and thus thermally expanded to increase the widths of the first positioning groove 45a and the second positioning groove 45b as compared to the widths at normal temperature, and then the first beam 34 and the fitted portion 35a of the second beam 35 may be fitted in the first positioning groove 45a and the second positioning groove 45b.

Next, the upper mold 50 will be described. As illustrated in FIG. 3, with the core 30 being assembled to (placed in) the lower mold 40, a clearance 23 is formed between the second rotor housing surface forming portion 46 and the core 30. Two mold protrusion pieces (not illustrated) are provided on a bottom surface 54 of the upper mold 50. A position, size, and window shape of the mold protrusion piece are determined so that when the upper mold 50 and the lower mold 40 are assembled, the mold protrusion piece on the upper mold 50 is just fitted in and fill the clearance 23.

The casting device 10 described above is completed in such a manner that the core 30 is assembled to (placed in) the lower mold 40, and then the upper mold 50 is assembled to the lower mold 40. Then, a pouring process is performed of pouring a molten aluminum alloy (molten metal) into the cavity 60 formed in the mold 20. Specifically, in a manufacturing method for manufacturing a caliper for a disc brake according to this embodiment, the cross beam 39 (fitted portion) of the core 30 is fitted in the positioning groove 45 (the first positioning groove 45a and the second positioning groove 45b) formed in the rotor housing surface forming portion 44 to place the core 30 in the mold 20, and then the pouring process is performed of pouring a molten aluminum alloy into the mold 20 in which the core 30 is placed. The cavity 60 is a space formed between the lower mold 40 and the upper mold 50 and the core 30.

In the casting device 10 according to this embodiment, the rotor housing surface 7 after casting is formed by the core print portion 32 of the core 30 and the rotor housing surface forming portion 44 (the mold blocks 44a to 44d) constituted by the mold. Thermal conductivity of silica sand for forming the core 30 is generally about 0.38 W/mK, and remarkably smaller than that of the mold (for example, thermal conductivity of S50C is about 54 W/mK). In a conventional caliper casting mold in FIG. 12, a base 210 having a large volume in the core 200 forms a rotor housing surface after casting, and thus a shrinkage cavity is easily generated in a cylinder or a rotor housing surface of a caliper after casting.

In the casting device 10 according to this embodiment, the rotor housing surface 7 of the caliper 1 is formed by the core 30, and also by the rotor housing surface forming portion 44 (the mold blocks 44a to 44d) formed by the mold having larger thermal conductivity than the core 30. This can increase a cooling speed of molten metal in an area for forming the cylinder 5 or the rotor housing surface 7 of the caliper 1, and accelerate timing for solidification as compared to the conventional example. This can prevent the molten metal in the area for forming the cylinder 5 or the rotor housing surface 7 of the caliper 1 from solidifying excessively later than other areas. Thus, generation of a shrinkage cavity in the cylinder 5 or the rotor housing surface 7 of the caliper 1 obtained by casting can be prevented. It is considered that the solidification timing of the molten metal around the core 30 is later than that of the molten metal in other areas, but the core 30 of this embodiment may have a smaller volume than a conventional core 200. Thus, molten metal can be supplied from a feeder head when the molten metal around the core 30 solidifies, thereby sufficiently preventing a shrinkage cavity.

The solidification timing of the molten metal in the area for forming the cylinder 5 and the rotor housing surface 7 of the caliper 1 can be controlled to desired timing by adjusting an area ratio of the core print portion 32 that constitutes the core 30 having low thermal conductivity and the rotor housing surface forming portion 44 (the mold blocks 44a to 44d) of the mold having remarkably higher thermal conductivity than the core 30 (the core print portion 32). Specifically, designing the core 30 having a high heat retaining property and the mold having a high cooling capability in a balanced manner can favorably prevent defects in the caliper 1 obtained by casting.

Further, in the casting device 10, when the core 30 is placed in the lower mold 40, the cross beam 39 included in the core print portion 32 is fitted in the positioning groove 45 in the rotor housing surface forming portion 44 formed in the lower mold 40. Thus, unlike the conventional example, a so-called box-like core 200 (base 210) is not placed in the mold, and thus placement position accuracy of the core 30 can be increased as compared to the conventional example. In particular, in this embodiment, the positioning groove 45 is formed as a cross groove, and the cross beam 39 is fitted in the cross groove without clearance. Thus, the positioning groove 45 also functions as a guide for placing the core 30. This can facilitate centering in assembling the core 30, and further increase accuracy of an assembling position. Also, the first positioning groove 45a and the second positioning groove 45b that constitute the positioning groove 45 are formed linearly and perpendicularly to each other, thereby increasing machinability of the lower mold 40 (mold). Specifically, machining accuracy of the lower mold 40 (mold) can be increased, and thus accuracy of an assembling position of the core 30 to the lower mold 40 can be also increased, thereby increasing dimension accuracy of a casting product. Also, as described above, the first positioning groove 45a and the second positioning groove 45b in the rotor housing surface forming portion 44 of the lower mold 40 are formed perpendicularly to each other, and thus the first beam 34 and the second beam 35 of the core 30 to be fitted in the first positioning groove 45a and the second positioning groove 45b are also formed perpendicularly to each other. This allows the core 30 to be formed bilaterally symmetrically and increases accuracy in molding the core 30. The first positioning groove 45a and the second positioning groove 45b (the first beam 34 and the second beam 35 of the core 30) formed in the rotor housing surface forming portion 44 of the lower mold 40 are not necessarily perpendicular to each other, but may intersect each other in order to increase placement position accuracy of the core 30 as compared to the conventional example.

Further, in the core 30 of this embodiment, the stopper portions 35b are provided at the opposite ends of the fitted portion 35a of the second beam 35 that constitutes the cross beam 39. Thus, when the fitted portion 35a of the second beam 35 is fitted in the second positioning groove 45b, the stepped surface 36 of the stopper portion 35b can abut against the side surface perpendicular to the second positioning groove 45b in the rotor housing surface forming portion 44 provided in the lower mold 40. This can further increase positioning accuracy of the core 30. Also, displacement of the core 30 from a normal position due to a flow of the molten metal poured into the cavity 60 in the pouring process can be favorably prevented. The side surface of the rotor housing surface forming portion 44 against which the stepped surface 36 of the stopper portion 35b abuts when the core 30 is assembled to the lower mold 40 is not necessarily perpendicular to the second positioning groove 45b of the rotor housing surface forming portion 44, but may intersect the second positioning groove 45b in order to expect an effect of increasing positioning accuracy of the core 30.

From the above, according to the casting device 10 of this embodiment, a technique can be provided capable of favorably preventing generation of a shrinkage cavity in solidification of molten metal poured into the casting device 10, and increasing accuracy of an assembling position of the core 30 to the mold 20 (the lower mold 40 in this embodiment), in casting the caliper 1. Also, as illustrated in FIG. 9, on the rotor housing surface 7 of the caliper 1 manufactured by the casting device 10 according to this embodiment, a substantially cross parting line Lp is formed in a boundary between the cross beam 39 (the first beam 34 and the second beam 35) of the core 30 and the rotor housing surface forming portion 44. In this embodiment, the cross beam 39 (the first beam 34 and the second beam 35) and the rotor housing surface forming portion 44 are designed to have the same height, and thus the parting line Lp causes a cross mark to appear on the rotor housing surface 7 of the manufactured caliper 1. Also, in the case where the cross beam 39 (the first beam 34 and the second beam 35) is designed to be lower than the rotor housing surface forming portion 44 as another aspect of the casting device 10, the parting line Lp forms a cross protrusion (also referred to as a "cross rib") on the rotor housing surface 7 of the caliper 1. This increases a surface area of the rotor housing surface 7 of the caliper 1, thereby increasing radiation performance of the caliper 1.

The embodiment described above is an example for illustrating the present invention, and various changes may be made without departing from the gist of the present invention. For example, in this embodiment, the casting device for casting an aluminum caliper has been described as an example, but not limited to this. The present invention may be applied to general caliper casting devices of a gravity casting type. Also, in this embodiment, the six-pot opposed-piston caliper has been described as an example, but the number of pistons is not particularly limited.

For example, FIG. 10 illustrates variants of the lower mold 40 and the core 30 described above. FIG. 10 illustrates a lower mold (die) 40A and a core 30A assembled to the lower mold 40A for casting a four-pot opposed-piston caliper with two pistons being placed on each side. Differences between the lower mold 40A and the core 30A, and the lower mold 40 and the core 30 for the six-pot opposed-piston caliper described above will be mainly described below. The core 30A is a sand mold placed in the lower mold 40A, and manufactured by heating and curing silica sand similarly to the core 30 described above.

The core 30A includes a cylinder forming portion 31' for forming a cylinder 5 after casting, a core print portion 32A coupled to the cylinder forming portion 31', an oil passage forming portion 33, or the like. The core 30A of this variant is different in including four cylinder forming portions 31' from the core 30 described above including the six cylinder forming portions 31. The core print portion 32A is coupled to the cylinder forming portions 31'.

The four cylinder forming portions 31' are denoted by reference numerals 31'a to 31'd. As illustrated in FIG. 10, the cylinder forming portions 31'a, 31'b and the cylinder forming portions 31'c, 31'd are arranged in a row. The core print portion 32A is provided between the cylinder forming portions 31'a, 31'b and the cylinder forming portions 31'c, 31'd, and the core print portion 32A integrally couples the cylinder forming portions 31'a to 31'd. Also, the cylinder forming portion 31'a and the cylinder forming portion 31'c, and the cylinder forming portion 31'b and the cylinder forming portion 31'd are provided to face each other.

The core print portion 32A includes a first coupling beam 321 that couples the cylinder forming portion 31'a and the cylinder forming portion 31'c facing the cylinder forming portion 31'a, and a second coupling beam 322 that couples the cylinder forming portion 31'b and the cylinder forming portion 31'd facing the cylinder forming portion 31'b. The first coupling beam 321 and the second coupling beam 322 are placed in parallel with each other. The core print portion 32A couples intermediate portions of the first coupling beam 321 and the second coupling beam 322, and has a third coupling beam 323 placed perpendicularly to the first coupling beam 321 and the second coupling beam 322.

The third coupling beam 323 includes a fitted portion 323a to be fitted in a positioning groove provided in the lower mold 40A described below, and a pair of stopper portions 323b provided at opposite ends of the fitted portion 323a. The stopper portion 323b is a member corresponding to the stopper portion 35b described above. The stopper portion 323b has a larger width than the fitted portion 323a, and a stepped surface 324 (see FIG. 10) is formed in a boundary between the stopper portion 323b and the fitted portion 323a. The stepped surface 324 is a surface that connects a side surface of the fitted portion 323a of the third coupling beam 323 and a side surface of the stopper portion 323b, and is formed perpendicularly to the side surface of the fitted portion 323a and the side surface of the stopper portion 323b.

A rotor housing surface forming portion 44' that forms a part of the rotor housing surface 7 after casting protrudes from an inner surface of the lower mold 40A. An I-shaped positioning groove 45' is provided in the rotor housing surface forming portion 44'. In this variant, a depth of the positioning groove 45' is the same as a height of the rotor housing surface forming portion 44', and the rotor housing surface forming portion 44' is divided into two mold blocks 44'a, 44'b with the positioning groove 45' therebetween. The rotor housing surface forming portion 44' constituted by the mold blocks 44'a, 44'b is a mold for forming a rotor housing surface of an area corresponding to an area around a circumferential center of the caliper after casting.

Next, a relationship between the core print portion 32A and the positioning groove 45' will be described. As described above, the fitted portion 323a of the core print portion 32A has the same width as the positioning groove 45', and the fitted portion 323a is fitted in the positioning groove 45'. The fitted portion 323a has the same length as the positioning groove 45' (in other words, the widths of the mold blocks 44'a, 44'b), and the core 30A to be assembled to the lower mold 40A is positioned with the stepped surface 324 formed in the boundary between the fitted portion 323a and the stopper portions 323b provided at the opposite ends of the fitted portion 323a abutting against side surfaces of the mold blocks 44'a, 44'b.

In this variant, the fitted portion 323a of the core print portion 32A of the core 30A is fitted in the positioning groove 45' provided in the rotor housing surface forming portion 44' in assembling the core 30A to the lower mold 40A, thereby allowing easy and accurate positioning of the core 30A. The caliper casting device, and the core and the mold used in the caliper casting device according to the present invention may be applied to a caliper for a disc brake with a one-way (first type) piston.

In the embodiments described above, the six-pot core 30 and the four-pot core 30A have been described as examples, but the application of the present invention is not limited to them. FIGS. 11A to 11C illustrate other variations of the core 30 according to Embodiment 1. FIG. 11A illustrates a two-pot core 30B, and FIG. 11B illustrates an eight-pot core 30C. FIG. 11C illustrates a five-pot core 30D. In FIGS. 11A to 11C, the same components as in the core 30 in FIG. 3 and the core 30A in FIG. 10 are denoted by the same reference numerals. Of course, cores other than the variations in FIGS. 11A to 11C may be applied. In the embodiments described above, the first beam 34 and the second beam 35 (the fitted portion 35a) have been described as an example of a combination of a first linear groove and a second linear groove perpendicular to each other, but the shape of the first beam 34 and the second beam 35 (the fitted portion 35a) perpendicular to each other may include a T shape. Specifically, the positioning groove may include at least a first linear groove and a second linear groove, and the positioning groove may be formed with other grooves being added. Thus, the positioning groove may have a cross shape, a T shape, and also an H shape, a # shape, or the like. The positioning groove may have a shape other than these exemplified shapes. Various changes may be made to the embodiments described above without departing from the gist of the invention. Also, the embodiments and the variants described above may be combined and carried out if possible. A product manufactured by the casting device according to this embodiment may be manufactured using aluminum, an aluminum alloy, and also titanium or magnesium, and various materials may be used.

REFERENCE SIGNS LIST

- 1: caliper
- 5: cylinder
- 7: rotor housing surface
- 10: casting device
- 20: mold
- 30: core
- 31: cylinder forming portion
- 32: core print portion
- 33: oil passage forming portion
- 34: first beam
- 35: second beam
- 35a: fitted portion
- 35b: stopper portion
- 36: stepped surface
- 37: third beam
- 38: fourth beam
- 39: cross beam
- 40: lower mold
- 44: rotor housing surface forming portion
- 45: positioning groove
- 45a: first positioning groove
- 45b: second positioning groove
- 50: upper mold
- 60: cavity

The invention claimed is:

1. A caliper casting device for casting a caliper for a disc brake including a cylinder into which a piston is fitted, and a rotor housing surface that defines a space for housing a disc rotor, comprising;
   a mold; and
   a core placed in the mold,
   the mold having a rotor housing surface forming portion that is configured to form a part of an inner wall surface of the rotor housing after casting, and
   the core being positioned and held in the rotor housing surface forming portion during casting, and forming a part of the inner wall surface of the rotor housing together with the rotor housing surface forming portion after casting, wherein:
   a positioning groove that positions and holds the core is formed in the rotor housing surface forming portion,
   the core includes a cylinder forming portion that forms the cylinder after casting, and a core print portion coupled to the cylinder forming portion, and
   the core print portion has a fitted portion that can be fitted in the positioning groove and forms the rotor housing surface together with the rotor housing surface forming portion after casting.

2. The caliper casting device according to claim 1, wherein:
   the positioning groove includes a first groove, and a second groove intersecting the first groove, and
   the fitted portion is fitted in the first groove and the second groove.

3. The caliper casting device according to claim 2, wherein the first groove and the second groove are linear grooves and perpendicular to each other.

4. The caliper casting device according to claim 1, wherein:
   the core print portion further includes a stopper portion that is provided at an end of the fitted portion and is wider than the positioning groove, and
   the stopper portion has a stepped surface that abuts against a side surface intersecting the positioning groove in the rotor housing surface forming portion when the fitted portion is fitted in the positioning groove.

5. The caliper casting device according to claim 1, wherein the core has a plurality of the cylinder forming portions, and each of the cylinder forming portions is coupled by the core print portion.

6. The caliper casting device according to claim 1, wherein the rotor housing surface forming portion has higher thermal conductivity than the core.

7. A caliper for a disc brake that is casted using a caliper casting device according to claim 1.

8. A core used in a caliper casting device for casting a caliper for a disc brake including a cylinder into which a piston is fitted, and a rotor housing surface that defines a space for housing a disc rotor, wherein the core is positioned and held, during casting, in a rotor housing surface forming portion of a mold in the caliper casting device, which rotor housing surface forming portion is configured to form a part of an inner wall surface of the rotor housing surface after casting, and wherein the core forms a part of the inner wall surface of the rotor housing together with the rotor housing surface forming portion after casting, and wherein:
   a positioning groove that positions and holds the core is formed in the rotor housing surface forming portion,
   the core includes a cylinder forming portion that forms the cylinder after casting, and a core print portion coupled to the cylinder forming portion, and
   the core print portion has a fitted portion that can be fitted in the positioning groove and forms the rotor housing surface together with the rotor housing surface forming portion after casting.

9. A mold used in a caliper casting device for casting a caliper for a disc brake including a cylinder into which a piston is fitted, and a rotor housing surface that defines a space for housing a disc rotor, wherein the mold has a rotor housing surface forming portion that is configured to form a part of an inner wall surface of the rotor housing after casting, and can position and hold a core that forms a part of the inner wall surface of the rotor housing together with the rotor housing surface forming portion after casting, and wherein:

a positioning groove that positions and holds the core is formed in the rotor housing surface forming portion, the core includes a cylinder forming portion that forms the cylinder after casting, and a core print portion coupled to the cylinder forming portion, and the core print portion has a fitted portion that can be fitted in the positioning groove and forms the rotor housing surface together with the rotor housing surface forming portion after casting.

10. A manufacturing method for manufacturing a caliper for a disc brake including a cylinder into which a piston is fitted, and a rotor housing surface that defines a space for housing a disc rotor, wherein:

the caliper casting device includes a mold having a rotor housing surface forming portion that is configured to form a part of an inner wall surface of the rotor housing after casting, and a core placed in the mold, and the manufacturing method comprises the steps of:

positioning and holding the core in the rotor housing surface forming portion to place the core in the mold; and pouring molten metal into the mold in which the core is placed, the core forming a part of the inner wall surface of the rotor housing together with the rotor housing surface forming portion after casting, wherein:

a positioning groove that positions and holds the core is formed in the rotor housing surface forming portion, the core includes a cylinder forming portion that forms the cylinder after casting, and a core print portion coupled to the cylinder forming portion, and the core print portion has a fitted portion that can be fitted in the positioning groove and forms the rotor housing surface together with the rotor housing surface forming portion after casting.

11. A caliper for a disc brake manufactured with a manufacturing method according to claim 10.

\* \* \* \* \*